Nov. 13, 1928.

Re. 17,133

F. E. LIETZ

SHINGLE LOCK

Original Filed Dec. 18, 1925

INVENTOR

Felix E. Lietz

BY

Bacon & Thomas

ATTORNEYS

Reissued Nov. 13, 1928. Re. 17,133

UNITED STATES PATENT OFFICE.

FELIX E. LIETZ, OF BUFFALO, NEW YORK, ASSIGNOR TO THE FLINTKOTE COMPANY, OF BOSTON, MASSACHUSETTS, A CORPORATION OF MASSACHUSETTS.

SHINGLE LOCK.

Original No. 1,583,254, dated May 4, 1926, Serial No. 76,166, filed December 18, 1925. Application for reissue filed October 22, 1927. Serial No. 228,087.

This invention relates to the type of shingles which are substantially square and laid diagonally on the roof and provided with turned-under corners to thicken their horizontal lower edges and give them a strong and heavy appearance. Usually, they are composed of composition roofing such as felt saturated with asphalt and faced with crushed slate or similar mineral, to render them flexible.

Some of the objects of my invention are to simplify the means for locking the lower corner of the shingle in place; to provide a strong concealed lock of this kind which will effectually withstand the lifting and loosening effect of wind and rain storms and to materially reduce the cost of the same.

A further object is to so construct the shingle and its locking device that the shingle can be easily adjusted up or down on the roof to aline it with adjacent shingles in the same row, and so that it is free to expand and contract in response to changes of temperature, thus preventing buckling of the shingle and allowing it to lie smooth under all weather conditions.

Figure 1:
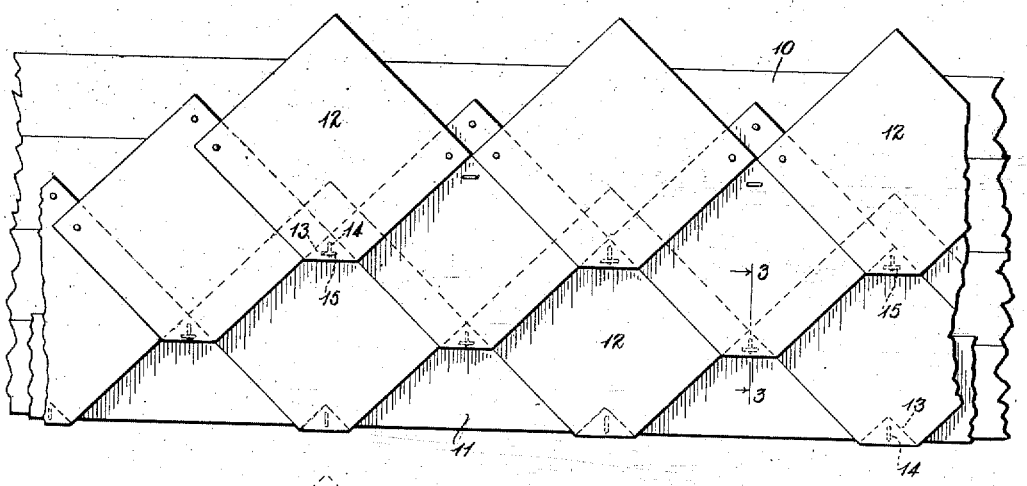
Figure 2:
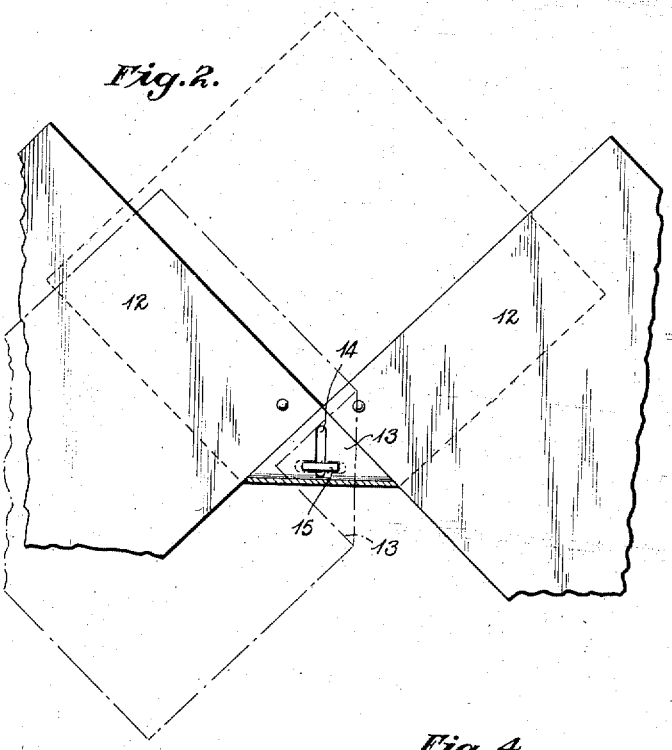
Figure 3:
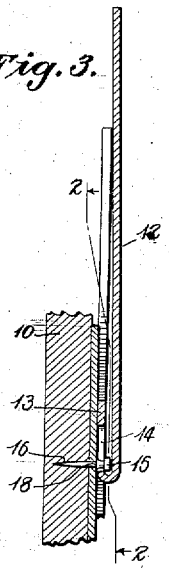
Figure 4:
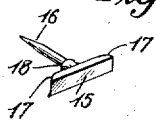

In the accompanying drawings:

Figure 1 is a fragmentary top plan view of a roof embodying the invention. Figure 2 is an enlarged fragmentary top plan view, partly in section, on line 2—2, Fig. 3. Figure 3 is a vertical longitudinal section of the roof on line 3—3, Fig. 1. Figure 4 is a perspective view of one of the fasteners.

Similar characters of reference indicate corresponding parts throughout the several views.

10 indicates the customary roof boards or sheathing and 11 the usual starting strip of roofing material laid along the margin of the roof.

The shingles 12 are preferably constructed of roofing material of the character above described and laid diagonally in overlying courses as usual. They are cut square, as shown, by suitable dies and the lower corner 13 of the shingle is folded or turned under its body and provided centrally with a substantially vertical slot 14 which interlocks with the head or cross-bar 15 of a substantially T-shaped fastener, by preference, of galvanized iron, the stem 16 of which passes through the slot and is driven through the underlying starting strip or shingle or both, into the roof board. The head or cross-bar of the fastener is of sufficient length to overlap the folded-under corner for some distance on either side of the slot to form a strong lock which rigidly holds the lower corner of the shingle down in place against the bending or lifting action of storms.

In laying and securing a shingle of this improved construction, assuming a course of such shingles to have been previously laid, one of the fasteners is driven into the roof-boards with its shank located below and in line with the meeting side corners of two previously-laid shingles and with its cross-head arranged horizontally, as shown in Fig. 1. A shingle with its slotted corner folded is then interlocked with the cross-head of the T-fastener by bringing the slot in line therewith, as shown by dot and dash lines in Fig. 2; then giving the shingle an upward quarter turn or swing to the position shown by dotted lines in said figure, bringing the slot at right angles to the cross-head, and finally nailing the side corners of the shingles to the roof-boards. To facilitate the turning or swinging movement of the shingle, the end portions of the T-fastener are beveled on their undersides, as shown at 17, in Fig. 4.

By this construction, the shingle is securely interlocked with the fastener and the latter is covered and concealed by the body of the shingle, producing a sightly roof exhibiting thick and heavy-appearing edges at the lower corners of the shingles.

Owing to the vertical arrangement of the locking-slots, the shingles, after being interlocked with the fasteners and before being nailed at the side corners, can be easily shifted up or down to accurately aline their folded lower edges and side corners with those of adjacent shingles in the same course.

As is well-known to those conversant with this art, changing weather conditions cause the flexible composition material, from which such shingles are cut, to expand or contract, with the result that the shingles bulge and buckle, detracting from the sightliness of the roof. The slots of these improved shingles permit the necessary vertical play of the shingles to compensate for such weather changes, allowing them to remain flat under all conditions and preserving the attractiveness of the roof.

The lock, while affording a strong and reliable fastening, is exceedingly simple in construction in that it involves no separate or additional parts and it can therefore be manufactured at a comparatively low cost.

The lock is of such a character that when the shingle is once properly engaged with the fastener, it is impossible for it to become loose or unlocked from it.

In practice, the shank of the fastener is usually provided with a flange or shoulder 18 to limit its penetration into the roof boards, the distance being predetermined so that the head of the fastener will not bind against the back of the folded corner in interlocking the shingle with the fastener.

While the construction hereinbefore described has been found very useful and desirable, I do not wish to be limited to it as it may be modified within the scope of the appended claims.

I claim as my invention:

1. The combination of a roof, a fastener of substantially T-form engaging the roof, and a flexible shingle having a turned-under lower corner provided with a slot interlocking with said fastener, the body of the shingle overlying and concealing the fastener and the shingle slot being disposed at an angle to the cross-head of the fastener, requiring a partial turn of the shingle relative to the fastener to interlock its folded corner therewith.

2. The combination of a roof, a headed fastener element engaging the roof, and a flexible shingle having a turned-under lower corner provided with a slot interlocking with said fastener when the shingle is in a predetermined position and is moved inwardly relative to the roof, said slot provided by the lower corner of the shingle and fastener being adapted to be brought into interlocking engagement upon a turning movement of the shingle relative to the fastener, the body of the shingle overlying and concealing the fastener and slot.

FELIX E. LIETZ.